Nov. 25, 1969

H. SCHMITT 3,480,151

SUPPORTING RACK OF QUARTZ

Filed March 28, 1968

2 Sheets-Sheet 1 cross section A-B

INVENTOR: Heinz Schmitt

By: Burgess, Dinklage & Sprung
Attorneys

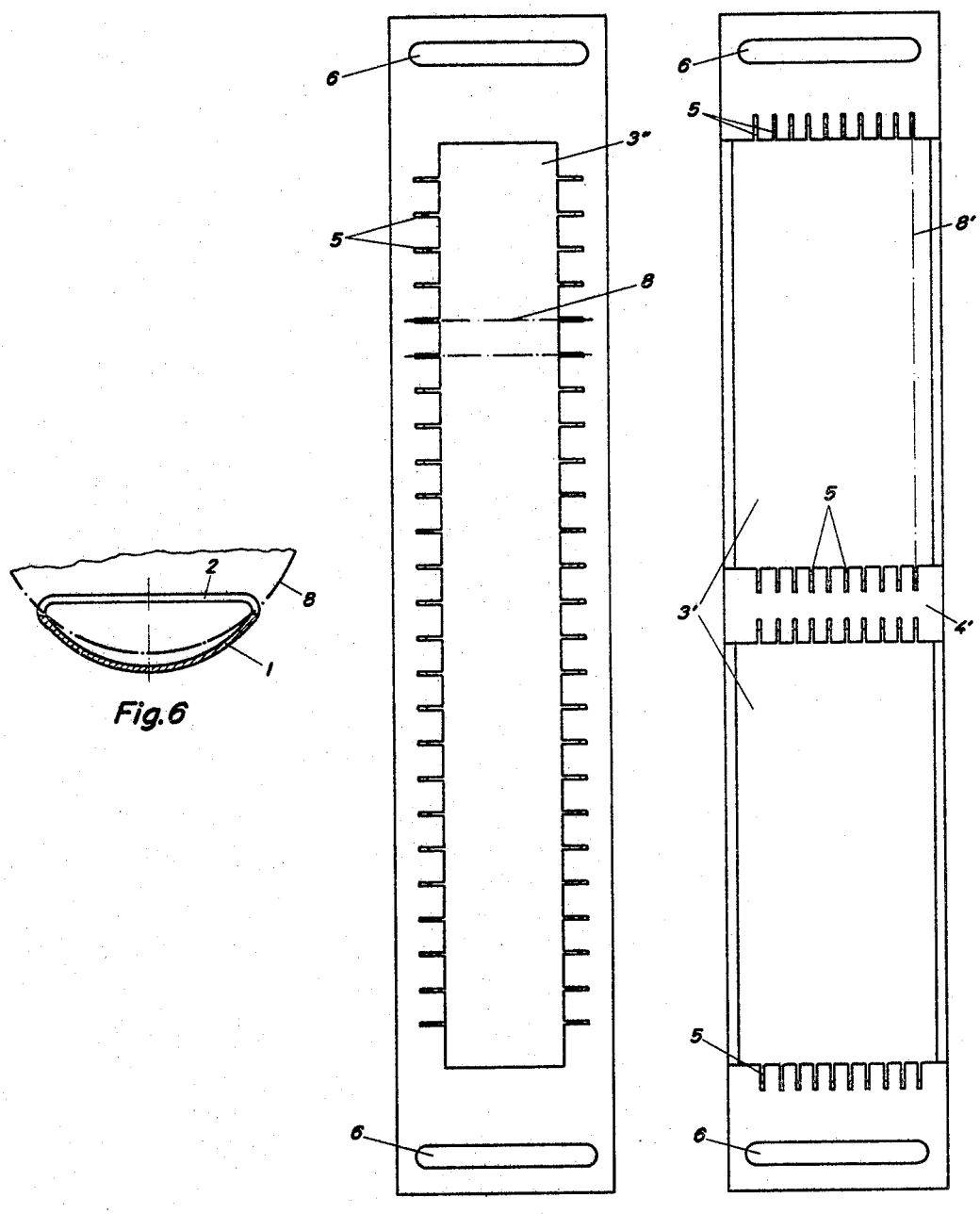

3,480,151
SUPPORTING RACK OF QUARTZ
Heinz Schmitt, Hanau am Main, Germany, assignor to Heraeus-Schott Quarzschmelze G.m.b.H., Hanau am Main, Germany
Filed Mar. 28, 1968, Ser. No. 716,894
Claims priority, application Germany, Apr. 5, 1967, H 58,659
Int. Cl. A47g 19/08
U.S. Cl. 211—41                                 9 Claims

ABSTRACT OF THE DISCLOSURE

A tubular supporting rack of quartz glass having a substantially flat upper wall containing narrow parallel slots into which objects such as thin disks, plates, wires or the like may be inserted for being treated so as to form, for example, semiconductors, One or more groups of these slots may be combined by one or more central apertures so that the slots are provided only in the opposite edge portions surrounding each aperture.

---

The present invention relates to a supporting rack of quartz and especially quartz glass, which is provided with slot-shaped recesses for receiving and supporting a larger number of thin elements such as thin plates, wires, disks or the like which are to be subjetced to certain treatments.

Such supporting racks of quartz glass are employed, for example, in the production and treatment of semiconductors. The supporting racks of quartz as heretofore known consist of several parts which are welded together. Thus, for example, one known type of these racks consists of a flat rectangular plate of quartz glass which is inserted into and welded to a frame which is made of a quartz rod. The plate itself is provided with slot-shaped recesses into which thin disks, plates or wires may be inserted. Another known type of such supporting racks consists of several quartz plates which are spaced from each other and are inserted into and welded together with a quartz rod which forms a closed frame. These plates are provided with opposite slots forming pairs. All of these known types of supporting racks can be manufactured only with considerable difficulties since when welding together the individual parts of the racks, considerable tensions and stresses occur which greatly reduce the durability of the racks and even cause many of them to be ruined while being produced. These supporting racks have the further disadvantage that the necessary welding operations render their cost of production very high.

It is an object of the present invention to provide a supporting rack of quartz and especially quartz glass which may be very easily produced and does not possess the disadvantages of the known supporting racks.

An important feature of the present invention for attaining this object consists in providing the supporting rack in the form of a tubular element which has at least one wall portion of a flat or substantially flat shape in which the slot-shaped recesses are provided. A supporting rack of this design may be produced without any welding operations and therefore does not possess the disadvantages of the known welded racks, especially the tensions and stresses which are caused by welding. The supporting rack according to the invention is preferably designed so that the flat or substantially flat wall portion of the tubular element is provided with at least one aperture and the remaining part of this wall portion is provided with pairs of parallel slots opposite to and in alignment with each other and extending from the edges of the aperture for a certain distance into the remaining flat part. The particular shape and design of these supporting racks depends upon the type, shape and size of the objects to be supported. Thus, for example, according to one embodiment of the invention, the flat wall portion of the tubular element is provided with a plurality of apertures which extend transverse to the longitudinal direction of the rack and are equally spaced from each other in the longitudinal direction. The flat wall portions intermediate adjacent apertures are then provided with slots extending from the opposite edges of the apertures in the longitudinal direction. In place of or in addition to such slots, it is also possible to provide the flat wall portions intermediate the apertures with grooves which are in longitudinal alignment with each other and extend from one edge of each wall portion to the other. For supporting long narrow plates or disks, it has been found advisable to provide the substantially flat wall portion of the tubular element with at least one longer aperture extending in the longitudinal direction of the element and then to provide the edges of the remaining flat wall portion adjacent to the outer ends of the aperture or apertures with slots. For supporting smaller plates, disks or the like, it is also possible to provide the substantially flat wall portion with at least one long aperture and the opposite longitudinal edges of this aperture with transverse slots.

According to another feature of the invention, the wall portion of the tubular element opposite to the substantially flat portion is provided with projections serving as feet for supporting the rack in a stable position. These projections preferably extend along the entire length of the rack and may be produced, for example, by making the lower part of the wall of the tubular element which supports the substantially flat wall portion of a substantially W-shaped cross section. The opposite ends of the flat part of the tubular element in which the aperture or apertures and the slots are formed are provided with brackets, bows or the like for manipulating and suspending the rack. These brackets are preferably secured to the flat wall portion of the tubular element by welding which may be accomplished without producing tensions or stresses in the main supporting part of the rack which might affect its durability.

The features and advantages of the present invention will become further apparent from the following detailed description thereof which is to be read with reference to the accompanying drawings, in which—

FIGURE 4 shows a top view of another supporting rack with two apertures extending in the longitudinal direction of its flat wall;

FIGURE 5 shows a top view of a further supporting rack with one long aperture and transversely extending slots; while FIGURE 6 shows a cross section similar to FIGURE 3, but of a supporting rack of a different cross-sectional shape.

Figures 1, 2, 3:
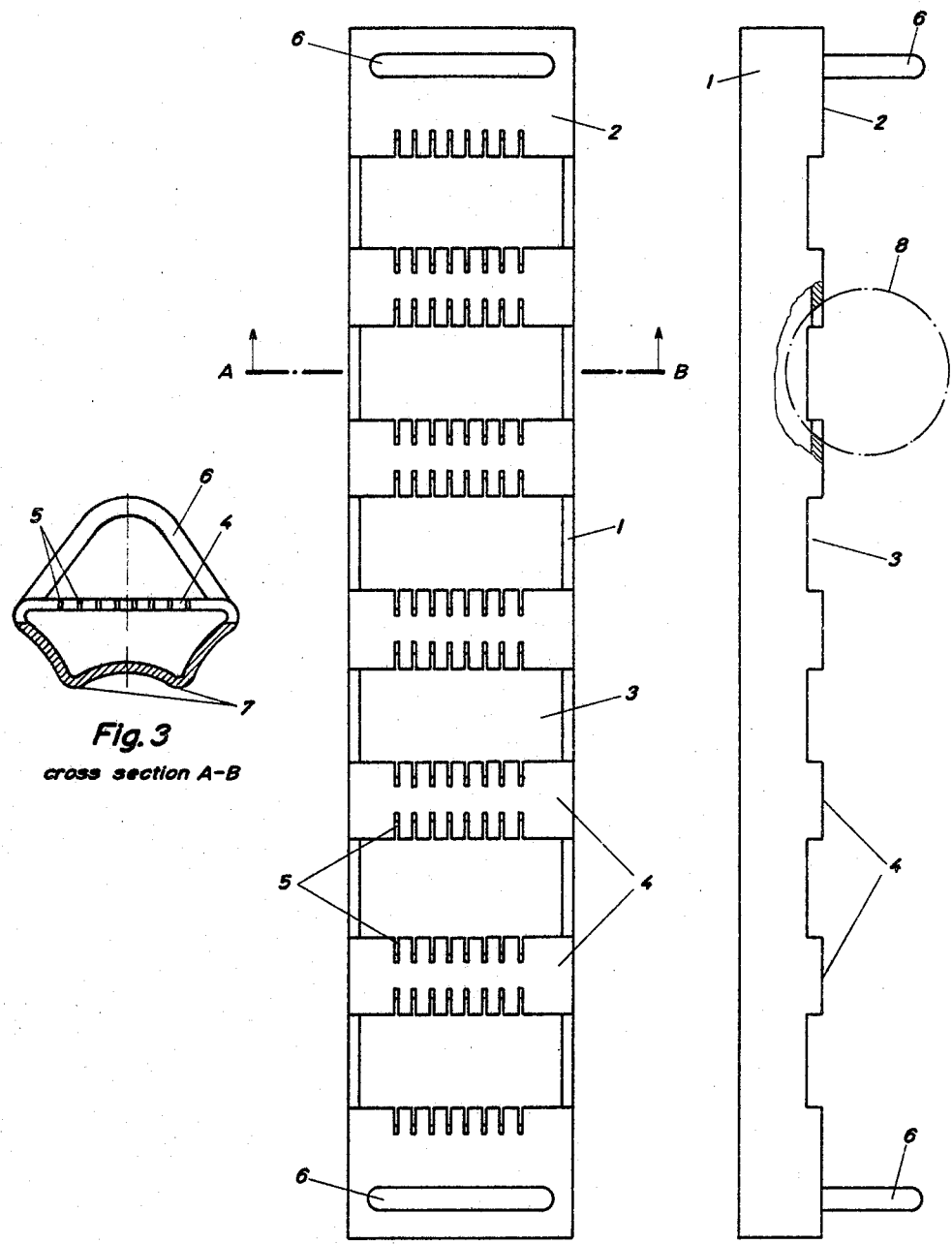
FIGURE 1 shows a top view of a supporting rack according to the invention with a plurality of apertures in its flat wall.
FIGURE 2 shows a side view thereof.
FIGURE 3 shows a cross section which is taken along the line A–B of FIGURE 2.

As illustrated in the drawings, the supporting rack according to the invention which consists of quartz glass consists of a tubular element 1 which, as shown particularly in FIGURES 3 and 6, has an upper substantially flat wall portion 2. According to the embodiment of the invention as shown in FIGURES 1 to 3, this flat wall portion 2 is provided with a plurality of parallel apertures 3 which extend transverse to the longitudinal direction of the rack. The transverse bridges 4 between the adjacent apertures 3 are provided with parallel slots 5 which extend from the lateral edges of the apertures for a certain distance into the flat bridges 4. The opposite slots 5 in corresponding positions adjacent to each aperture 3 are preferably in longitudinal alignment and each pair of them together with the intermediate aperture 3 is adapted to receive, for example, a disk 8, as indicated in FIGURE 2, which is to be subjected to certain treatments. As shown in FIGURE 3, the lower wall portion of the tubular element 1 which supports the substantially flat wall portion 2 is preferably made of a substantially W-shaped cross section so as to form supporting feet 7 which extend in the longitudinal direction of the rack from one end thereof the other. For manipulating the rack and for suspending it on suitable means, a pair of bow-shaped members 6 are secured to the flat wall 2 near the opposite ends thereof.

FIGURE 4 illustrates another supporting rack according to the invention which is designed for supporting long disks or plates, as indicated by dot-and-dash lines at 8″. The substantially flat upper wall portion 2 of the tubular element 1 is for this purpose provided with a pair of apertures 3′ which extend in the longitudinal direction of the rack and are separated by a transverse bridge 4′. The edges of this bridge 4′ and of the outer flat parts are provided with short slots 5 which extend in the longitudinal direction and parallel to each other and are adapted to receive the disks or plates 8″ in the same manner as shown in FIGURE 2.

The corresponding slots 5 in the edge portions of the transverse bridge or bridges 4 or 4′ according to FIGURES 1 and 4 may also be connected by grooves in the upper surface of these parts. In certain cases it may also suffice to omit the slots 5 and merely to provide the upper surface of the bridge or bridges 4 or 4′ with grooves extending across the entire width of these parts.

FIGURE 5 shows a top view of a further supporting rack according to the invention. The substantially flat upper wall portion of this tubular rack is provided with a single long aperture 3″ so that the remainder of the wall portion forms a rectangular frame. Instead of being provided with longitudinally extending slots in the transverse edge portions of the remaining flat parts as shown in FIGURE 4, the rack according to FIGURE 5 is provided with a large number of slots 5 which extend transversely from the longitudinal edges of the aperture 3″ into the lateral parts of the frame and are adapted to receive a large number of smaller disks or plates 8.

FIGURE 6 finally shows a supporting rack which consists of a tubular element 1 which has a cross-sectional shape different from that as shown in FIGURE 3 and is provided with transverse slots similar to those shown in FIGURE 5 into each of which a disk 8 may be inserted. Instead of having a round bottom wall as shown in this drawing, the central part of this bottom wall may also be flattened and extend parallel to the flat upper wall portion 2.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A supporting rack consisting of a quartz material and comprising an elongated tubular member having at least one substantially flat wall portion extending at least along the greatest part of the length of said rack and having a plurality of narrow slots therein into which thin objects may be inserted so as to be supported by the walls of said slots.

2. A supporting rack as defined in claim 1, wherein said substtantially flat wall portion has at least one aperture therein considerably larger than said slots, said slots extending for a certain distance into said wall portion from at least two opposite edges thereof defining said aperture, the slots in corresponding positions in said opposite edges being in straight alignment with each other.

3. A supporting rack as defined in claim 2, wherein a plurality of said apertures are provided substantially parallel to each other and have a greater length transverse to the longitudinal direction of said rack and are spaced from each other by transverse strips having edge portions containing said slots.

4. A supporting rack as defined in claim 2, wherein said flat wall portion has at least one elongated aperture therein extending in the longitudinal direction of said rack, said slots likewise extending in said longitudinal direction in the opposite edge portions defining the ends of said aperture.

5. A supporting rack as defined in claim 2, wherein said flat wall portion has at least one elongated aperture therein extending in the longitudinal direction of said rack, said slots extending in the lateral edge portions defining said aperture and transverse to said longitudinal direction.

6. A supporting rack as defined in claim 1, wherein when said tubular member extends in a horizontal position, said flat wall portion forms an upper part and the remaining wall portion forms a lower part, said lower part having projections thereon forming feet for supporting said rack.

7. A supporting rack as defined in claim 6, wherein said projections extend substantially along the entire length of said rack.

8. A supporting rack as defined in claim 6, wherein said lower part of said tubular member has a substantially W-shaped cross section.

9. A supporting rack as defined in claim 1, further comprising a member on each end of said flat wall portion for manipulating and suspending said rack.

References Cited

UNITED STATES PATENTS

| | | | |
|---|---|---|---|
| 601,753 | 4/1898 | Kaiser | 211—41 |
| 1,008,124 | 11/1911 | Dudley | 211—41 |
| 1,480,043 | 1/1924 | Blakeslee | 211—41 |
| 2,864,508 | 12/1958 | Koncyk | 211—40 |

JAMES A. LEPPINK, Primary Examiner